US011183062B2

(12) United States Patent
Cajias et al.

(10) Patent No.: US 11,183,062 B2
(45) Date of Patent: Nov. 23, 2021

(54) METHOD AND SYSTEM FOR PROVIDING PARKING RECOMMENDATIONS

(71) Applicant: HERE Global B.V., Eindhoven (NL)

(72) Inventors: Raul Cajias, Berlin (DE); Daniel Rolf, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/820,217

(22) Filed: Mar. 16, 2020

(65) Prior Publication Data

US 2021/0287541 A1 Sep. 16, 2021

(51) Int. Cl.
*G08G 1/14* (2006.01)

(52) U.S. Cl.
CPC .................... *G08G 1/144* (2013.01)

(58) Field of Classification Search
CPC .............. G08G 1/143; G01C 21/3685
See application file for complete search history.

(56) References Cited

U.S. PATENT DOCUMENTS

| | | | |
|---|---|---|---|
| 7,538,690 B1 | 5/2009 | Kaplan et al. | |
| 8,432,297 B2 | 4/2013 | Sonnabend et al. | |
| 9,959,761 B2 | 5/2018 | Tsyrklevich | |
| 2011/0077853 A1* | 3/2011 | Ranford | G01C 21/3423 |
| | | | 701/533 |
| 2012/0056758 A1 | 3/2012 | Kuhlman et al. | |
| 2012/0330544 A1* | 12/2012 | Joong | G01C 21/3605 |
| | | | 701/408 |
| 2013/0158853 A1* | 6/2013 | Li | G08G 1/144 |
| | | | 701/400 |
| 2015/0177002 A1 | 6/2015 | Sourani et al. | |
| 2015/0213716 A1* | 7/2015 | Aggarwal | G08G 1/144 |
| | | | 340/932.2 |
| 2018/0047288 A1 | 2/2018 | Cordell et al. | |
| 2020/0011671 A1* | 1/2020 | Puri | G01C 21/3492 |

FOREIGN PATENT DOCUMENTS

DE 102016002081 A1 9/2016

OTHER PUBLICATIONS

Hawkins, "Google's Waze Will Now Help You Find the Best Parking Spot", Sep. 19, 2016, retrieved from https://www.theverge.com/2016/9/19/12972124/waze-inrix-google-find-parking-spot-data-traffic, pp. 1-3.

Smith, "Google Maps Will Now Suggest a Parking Spot When You're Close to Your Destination", Sep. 20, 2018, retrieved from https://bgr.com/2018/09/20/google-maps-will-now-suggest-a-parking-spot-when-youre-close-to-your-destination/, 6 pages.

* cited by examiner

*Primary Examiner* — Fabricio R Murillo Garcia
(74) *Attorney, Agent, or Firm* — Ditthavong, Steiner & Mlotkowski

(57) ABSTRACT

A method and a system for providing a parking recommendation are disclosed herein. The method may include obtaining a route destination location from a user equipment, obtaining parking data for a pre-determined time period, wherein the parking data comprises a plurality of parked locations and a plurality of destination locations, and providing the parking recommendation based on a last mile model, wherein the last mile model is based on the route destination location and the obtained parking data, wherein the last mile model comprises a time-dependent distance threshold.

20 Claims, 9 Drawing Sheets

METHOD AND SYSTEM FOR PROVIDING PARKING RECOMMENDATIONS

TECHNOLOGICAL FIELD

The present disclosure generally relates to routing and navigation systems, and more particularly relates to providing parking related information for routing and navigation applications.

BACKGROUND

Currently, growth in number of vehicles present on city roads has dramatically increased the demand for parking spaces at route destinations. Further, the demand for the parking spaces becomes even worse, when the route destinations correspond to public places such as malls, markets, event venues and the like. As a result, finding available parking spaces and that too well in time before reaching route destinations have become a challenging task for drivers. One of the preferred choices of a user of a vehicle, such as a driver, is to park the vehicle around their route destination. However, to do so, the driver needs to spend an additional amount of time for searching a parking space even after reaching the route destination. Further, the driver may have to travel certain distance after reaching the route destination to park the vehicle, leading to wastage of vehicle miles and also becoming a source of increased pollution. Furthermore, information related to available on-street parking spaces is not available easily. This is primarily due to lack of available sensors which may be able to report actual vehicle parking positions. Further, even though there are many competing parking information providers for providing on-street parking related recommendations and information, but they rarely exchange information amongst themselves. This leads to the problem of lack of availability of accurate parking availability data and such parking availability data is at best probabilistic in nature. Accordingly, there is a need for availability of better parking solutions to the users, such as travelers and drivers alike.

BRIEF SUMMARY OF SOME EXAMPLE EMBODIMENTS

Various embodiments provide for availability of better parking solutions to the users of navigation applications such that wastage of vehicle miles and time needed in searching for a parking space on reaching near a route destination can be avoided. The methods and systems disclosed herein provide for sourcing of parking data from a plurality of navigation clients and/or from a plurality of user devices, such as user equipments which may be associated with a vehicle. The parking data may comprise a plurality of parked locations, such as parking spots and a plurality of destination locations. As used herein, a destination location may be an observed location such as a point of interest (POI). The POIs may include, but are not limited to, hotels, restaurants, museums, stadiums, offices, auto repair shops, buildings, stores, shopping malls and parks. Various embodiments provide for obtaining a route destination location. As used herein, the route destination location may be an address in a geographical map. The geographical map may be a two-dimensional map (for instance, a digital map) and/or three-dimensional map that may include observed locations and unobserved locations. In various embodiments, the observed location may correspond to a location on the geographical map for which parking related data is available. For example, the observed location could be a location at which a threshold number of parking events have been observed previously. Thus, the observed location may be one of a plurality of parked locations that may be used for providing the parking recommendation. In various embodiments, the unobserved location corresponds to a location on the geographical map for which parking related data may not be available and that may comprise less or no observation of occurrence of any parking event at such a location.

Various embodiments provide for aggregating the sourced parking data. The data aggregation is achieved by generating a last mile model for the obtained route destination location by utilizing the sourced parking data. The sourced parking data may be historic parking data, that is to say, the sourced parking data may be obtained using previously parked locations, previous route destination locations, previous POIs visited and the like. Thus, in some embodiments, the sourced parking data may be historic parking data. As used herein, the last mile model may comprise a parking map comprising a centroid location for the parked locations, an average walking distance from the centroid location to the plurality of parked locations, and a standard deviation distance for the plurality of parked locations. Various embodiments provide for providing a parking recommendation to the user for navigating to the route destination location. As used herein, the parking recommendation may be a notification on the navigation client or on the user equipment to start a parking search and/or to obtain a parking search cruise route. In various embodiments, the parking recommendation may be provided prior to reaching the destination location. Accordingly, various unwanted situations associated with parking a vehicle may be avoided. The unwanted situations may include vehicle driving time, wastage of vehicle miles, unnecessary pollution and the like.

A system and method are provided in accordance with an example embodiment described herein for providing a parking recommendation.

In one aspect, a method for providing a parking recommendation is disclosed. The method may comprise obtaining a route destination location from a user equipment; obtaining parking data for a pre-determined time period, wherein the parking data comprises a plurality of parked locations and a plurality of destination locations; and providing the parking recommendation based on a last mile model, wherein the last mile model is based on the route destination location and the obtained parking data, wherein the last mile model comprises a time-dependent distance threshold.

According to some example embodiments, the last mile model may further comprise a centroid location based on the obtained parking data.

According to some embodiments, providing the parking recommendation may further comprise providing a notification on the user equipment to start a parking search, based on a comparison of a distance between the centroid location and a location of the user equipment, with the time-dependent distance threshold.

According to some embodiments, providing the parking recommendation further comprises generating a parking search cruising route based on per-link parking availability estimates.

According to some example embodiments, the obtained parking data may further comprise a time stamp corresponding to each of the plurality of parked locations.

According to some example embodiments, providing the parking recommendation based on the last mile model may further comprise determining a plurality of equal-sized time epochs corresponding to the pre-determined time period;

and grouping the obtained parking data, based on the determined plurality of equal-sized time epochs and the time stamp corresponding to each of the plurality of parked locations.

According to some example embodiments, providing the parking recommendation based on the last mile model may further comprise selecting at least one equal-sized time epoch of the plurality of equal-sized time epochs; computing the centroid location for the obtained parking data corresponding to the selected equal-sized time epoch; and determining the time-dependent distance threshold associated with the route destination location, based on the computed centroid location and the obtained parking data corresponding to the selected equal-sized time epoch.

According to some example embodiments, providing the parking recommendation based on the last mile model may further comprise determining a standard deviation distance associated with the route destination location, based on the time-dependent distance threshold and the obtained parking data corresponding to the selected equal-sized time epoch; and generating the last mile model comprising the time-dependent distance threshold and the standard deviation distance associated with the route destination location.

According to some example embodiments, the time-dependent distance threshold is based on an average walking distance associated with the centroid location and the plurality of parked locations associated with the obtained parking data for the pre-determined time period.

According to some example embodiments, the centroid location may comprise a center location associated with the plurality of parked locations associated with the obtained parking data for the pre-determined time period.

According to some example embodiments, the centroid location may be associated with at least one of an address, a point of interest (POI), a cluster of POIs, a building footprint, a city block, or a cluster of city blocks.

According to some example embodiments, providing the parking recommendation may further comprise providing the notification on the user equipment to start a parking search when the distance between the centroid location and the location of the user equipment is lesser than the time-dependent distance threshold.

According to some example embodiments, providing the parking recommendation may further comprise providing a prompt on a user interface of the user equipment to select an alternate destination area, based on the centroid location of the last mile model; and providing route navigation information for the alternate destination area on selecting the prompt.

In another aspect, a method for providing a parking recommendation is disclosed. The method may comprise obtaining parking data for a predetermined time period, wherein the parking data comprises a plurality of parked locations and a plurality of destination locations; determining a time-dependent distance threshold based on a last mile model associated with the obtained parking data, wherein the time-dependent distance threshold comprises an average walking distance threshold associated with the plurality of parked locations and the plurality of destination locations; and providing the parking recommendation based on the determined time-dependent distance threshold.

In yet another aspect, a system for providing a parking recommendation is disclosed. The system may comprise a memory configured to store computer-executable instructions; and one or more processors configured to execute the instructions to: obtain a route destination location from a user equipment; obtain parking data for a pre-determined time period, wherein the parking data comprises a plurality of parked locations and a plurality of destination locations; and provide the parking recommendation based on a last mile model, wherein the last mile model is based on the route destination location and the obtained parking data, wherein the last mile model comprises a time-dependent distance threshold.

According to some example embodiments, the last mile model may further comprise a centroid location based on the obtained parking data.

According to some example embodiments, to provide the parking recommendation, the one or more processors may be further configured to provide a notification on the user equipment to start a parking search, based on a comparison of a distance between the centroid location and a location of the user equipment with the time-dependent distance threshold.

According to some example embodiments, the time-dependent distance threshold may be based on an average walking distance associated with the centroid location and the plurality of parked locations associated with the obtained parking data for the pre-determined time period.

According to some example embodiments, the obtained parking data may further comprise a time stamp corresponding to each of the plurality of parked locations.

According to some example embodiments, wherein to provide the parking recommendation, the one or more processors may be further configured to: determine a plurality of equal-sized time epochs corresponding to the pre-determined time period; and group the obtained parking data, based on the determined plurality of equal-sized time epochs and the time stamp corresponding to each of the plurality of parked locations.

BRIEF DESCRIPTION OF DRAWINGS

Figure 1:
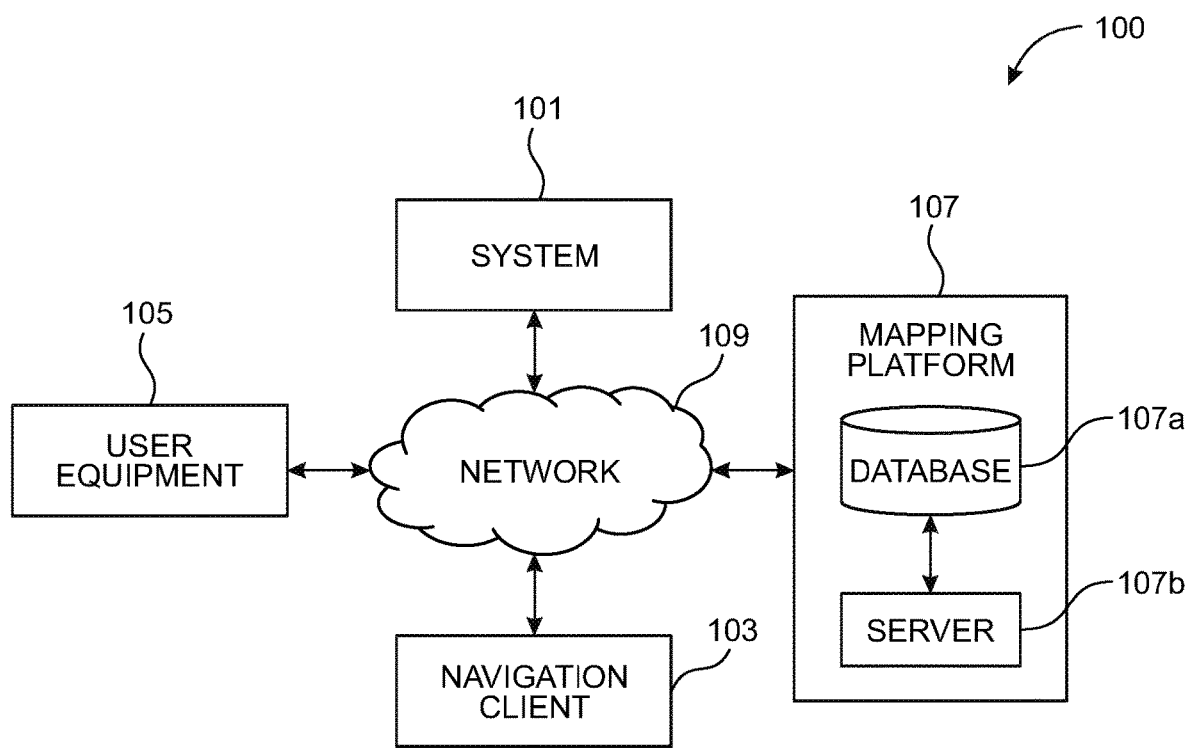
Figure 2:
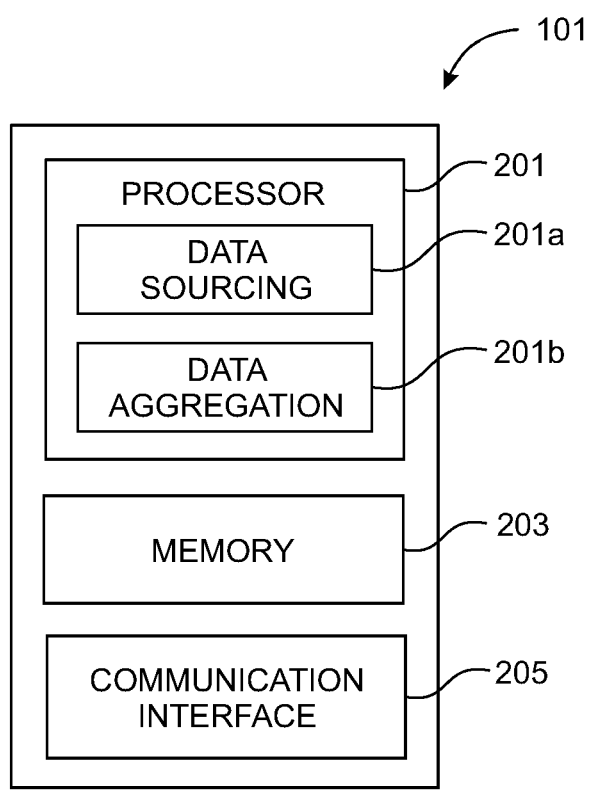
Figure 3:
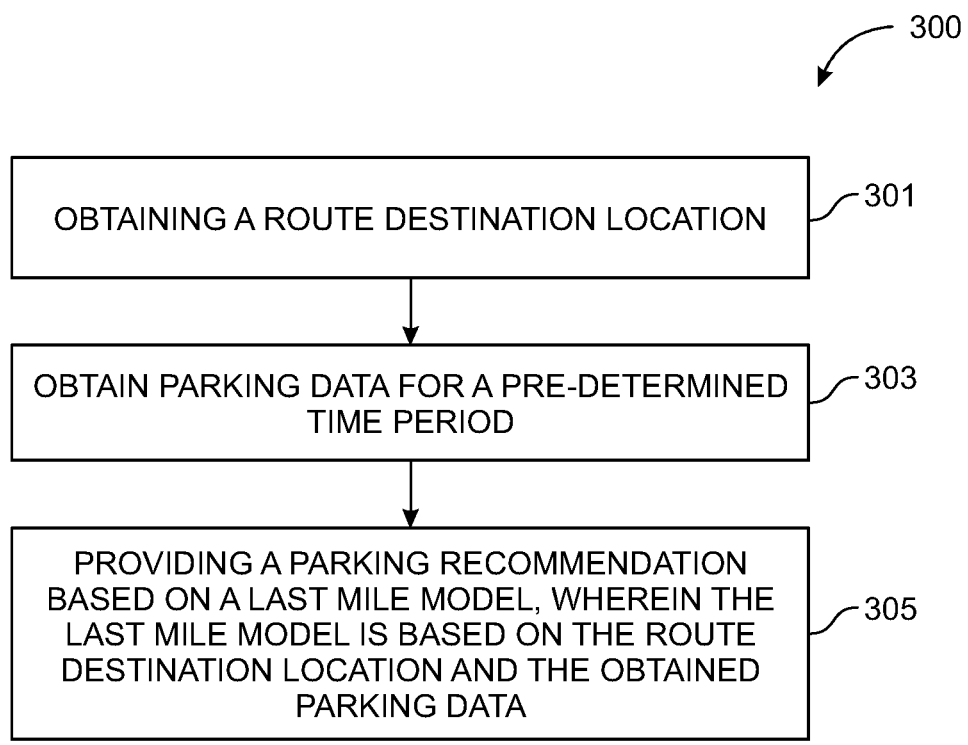
Figure 4:
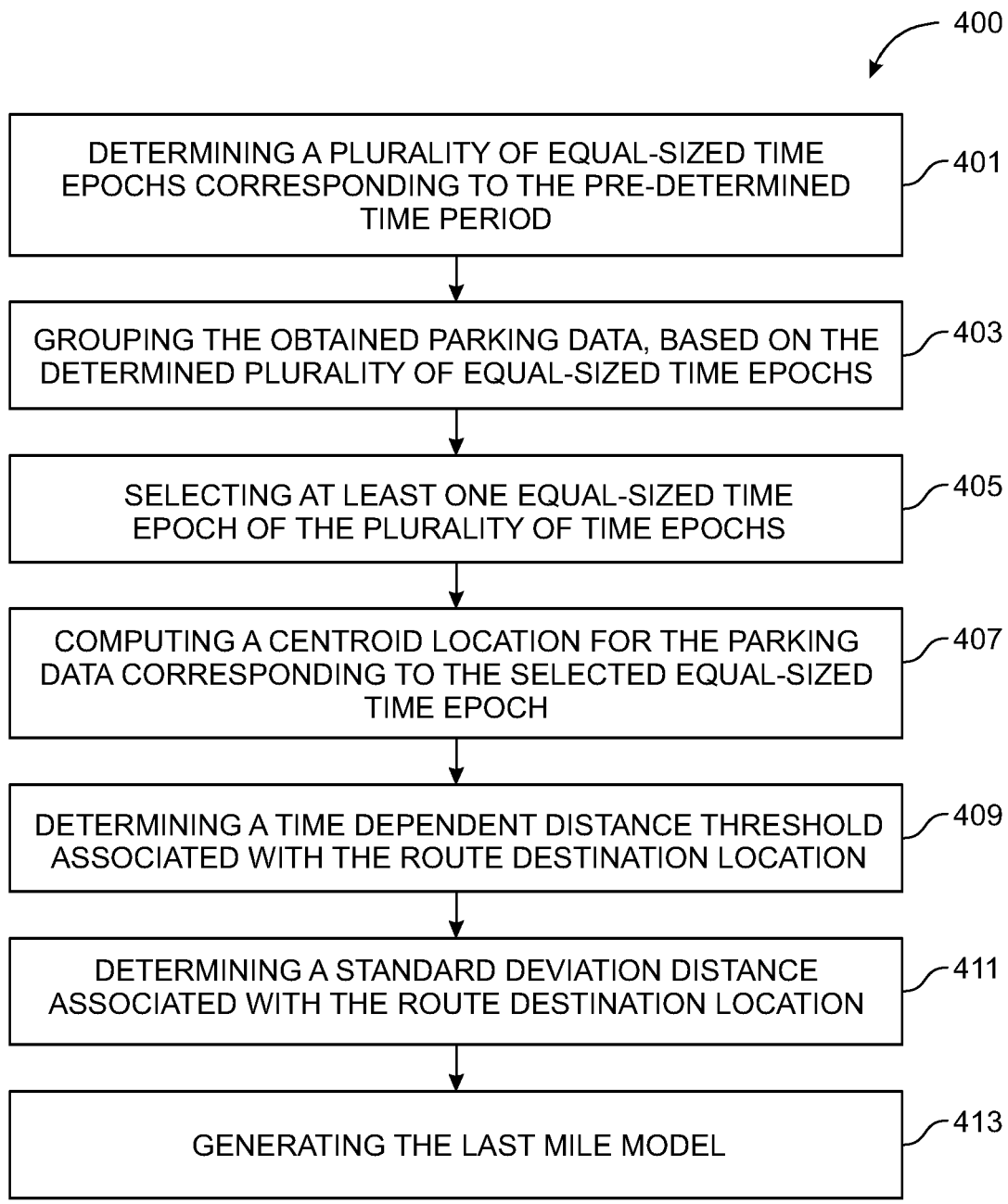
Figure 5:
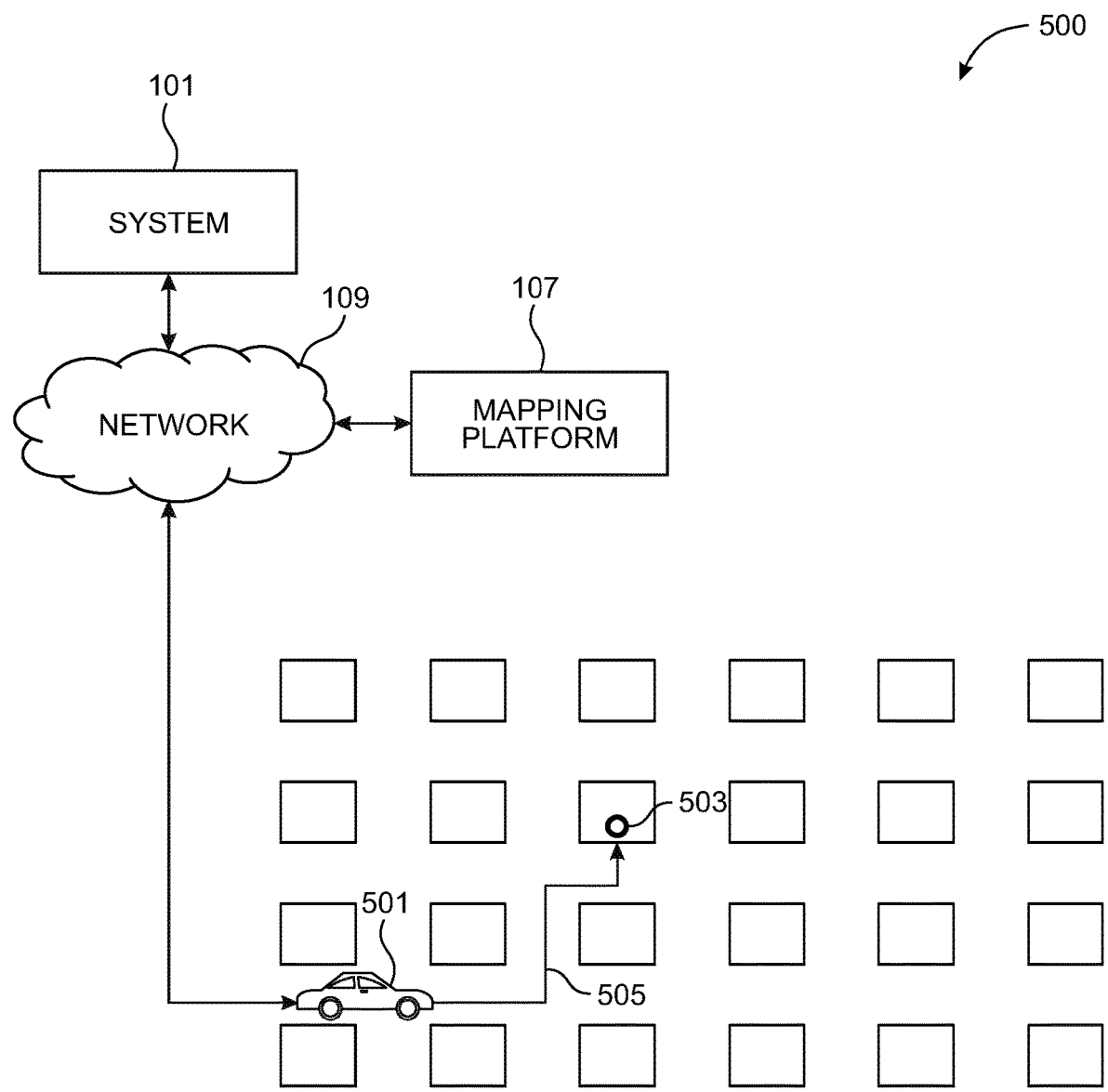
Figure 6:
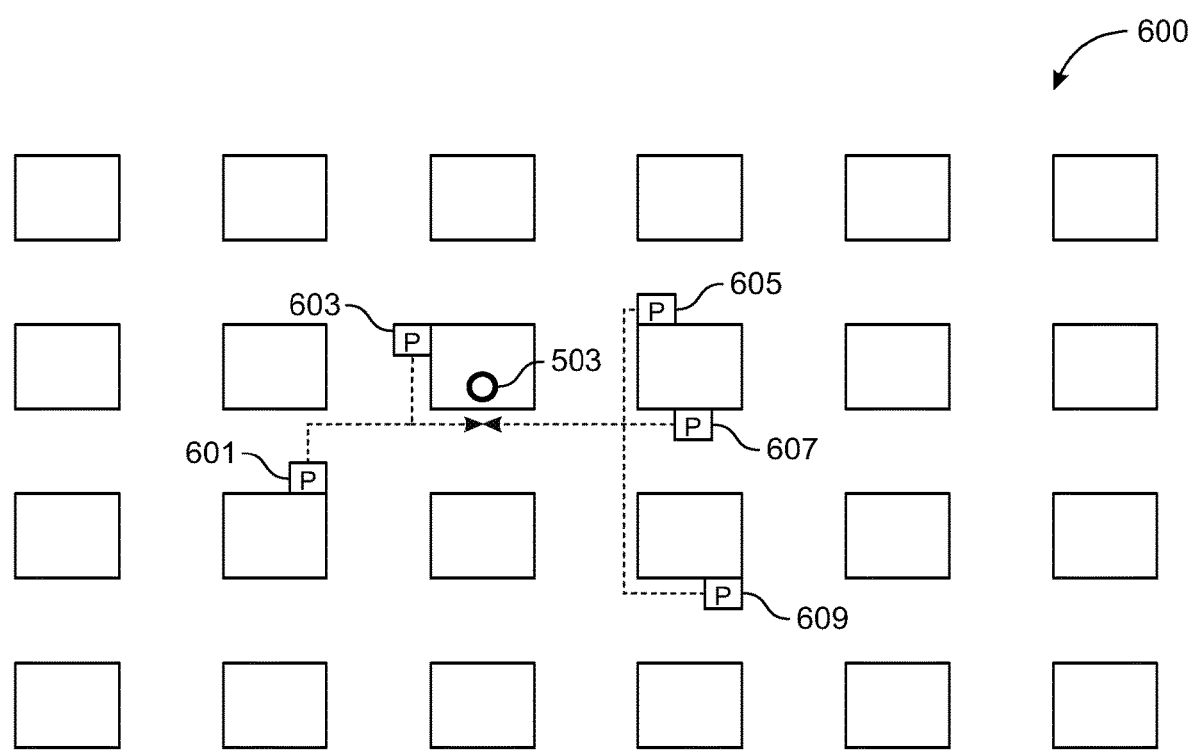
Figure 7:
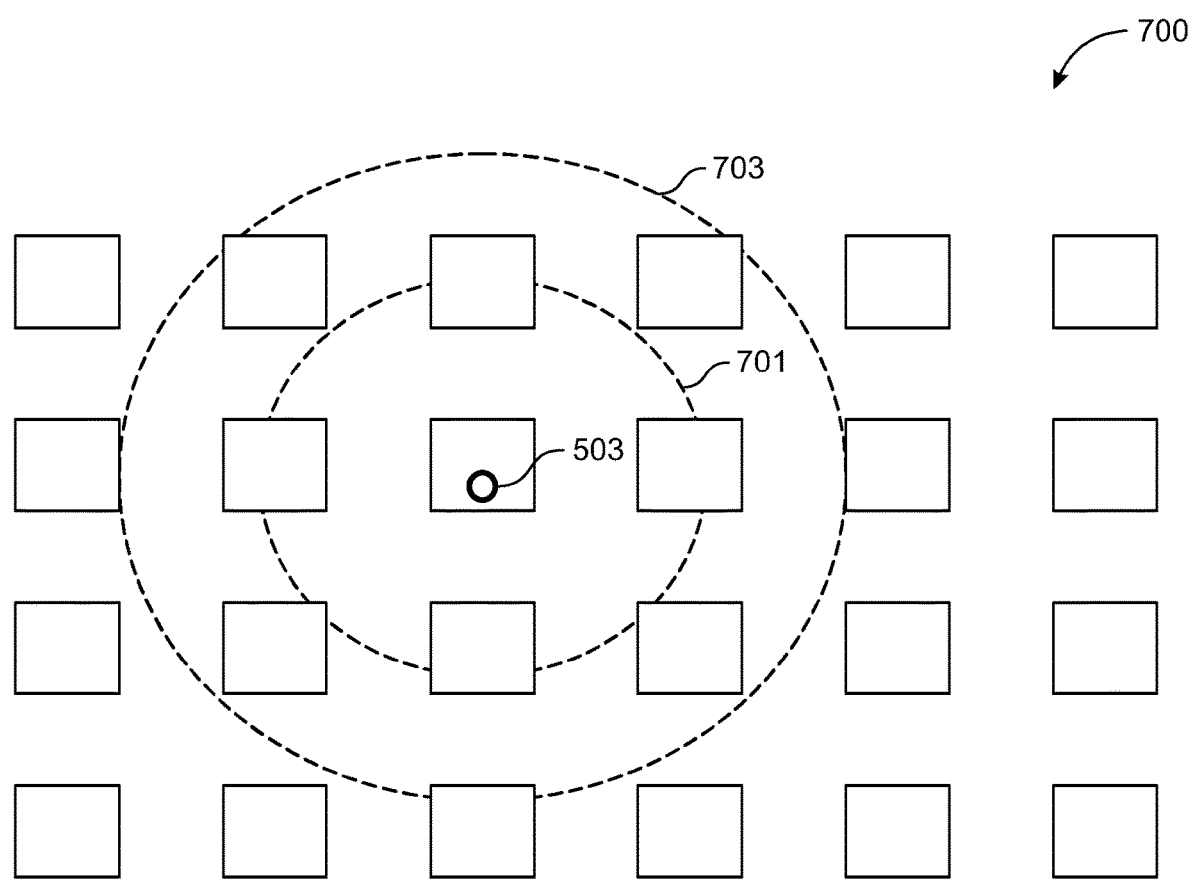
Figure 8:
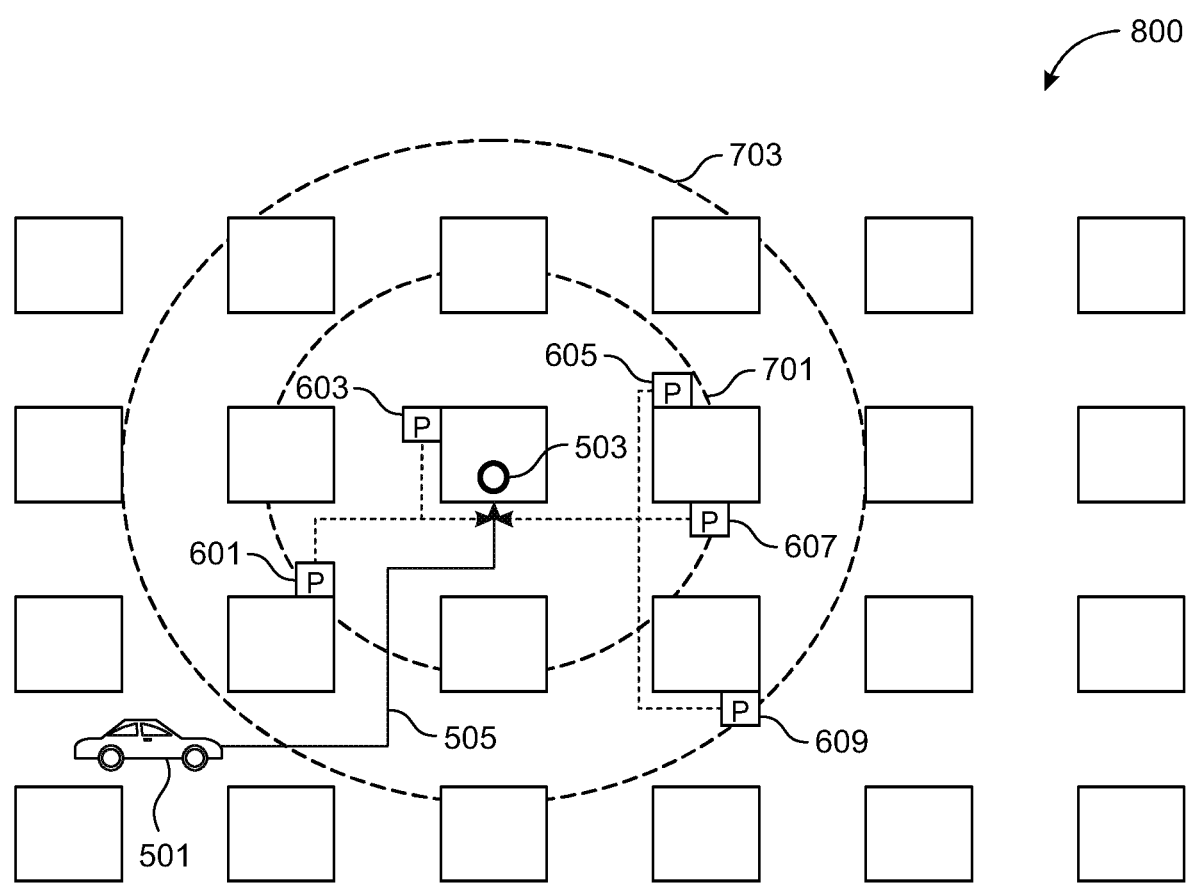
Figure 9:
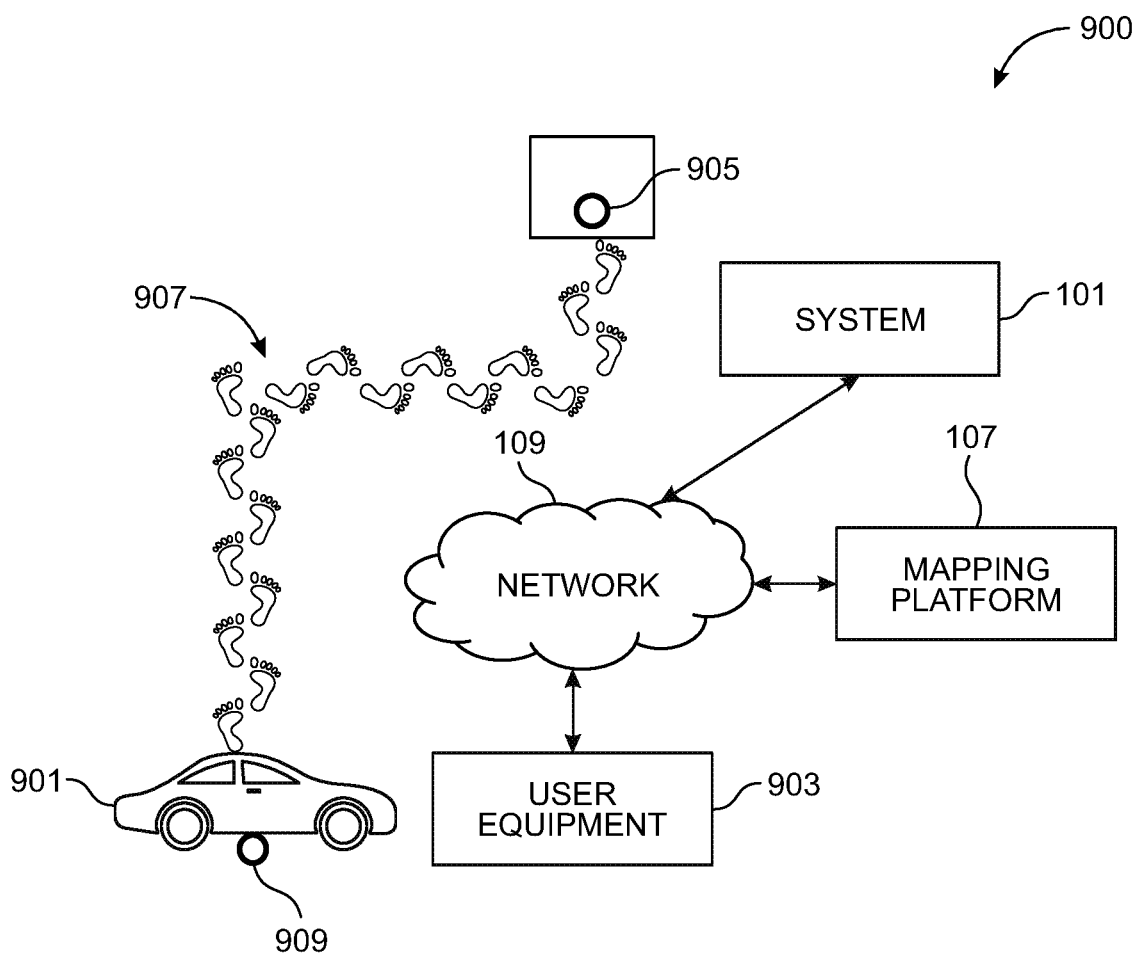

Having thus described example embodiments of the invention in general terms, reference will now be made to the accompanying drawings, which are not necessarily drawn to scale, and wherein:

FIG. 1 illustrates a block diagram showing an example architecture of one or more example embodiments of the present invention;

FIG. 2 illustrates a block diagram of a system for providing a parking recommendation, in accordance with one or more example embodiments;

FIG. 3 illustrates a flowchart depicting a method for providing the parking recommendation, in accordance with one or more example embodiments;

FIG. 4 illustrates a flowchart depicting a method for generating a last mile model for a route destination location, in accordance with one or more example embodiments;

FIG. 5 illustrates an exemplary scenario for providing the parking recommendation, in accordance with one or more example embodiments;

FIG. 6 illustrates an exemplary walking distance distribution map, in accordance with one or more example embodiments;

FIG. 7 illustrates an exemplary last mile model for the route destination location, in accordance with one or more example embodiments;

FIG. 8 illustrates an exemplary scenario for providing the parking recommendation based on the last mile model, in accordance with one or more example embodiments; and FIG. 9 illustrates an exemplary scenario for sourcing the parking data, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses/systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

A method and system are provided herein in accordance with one or more example embodiments for providing parking recommendations. Various embodiments are provided to obtain parking data for a pre-determined time period. The parking data may comprise a plurality of destination locations and a plurality of parked locations associated with each of the destination locations. In various embodiments, the parked locations associated with each of the destination locations may dynamically vary with respect to time. Accordingly, the parking data is obtained for the pre-determined time period. The time period may be a period of a day, a week, a month, or a year. Various embodiments are provided to obtain a route destination location. For example, the route destination location may be obtained from navigation client or user equipment. In various embodiments, the route destination may be an address provided by a user of a vehicle. The address provided by the user may be any location in the geographical map that includes observed locations and unobserved locations.

Various embodiments are provided to generate a last mile model for the obtained route destination. In various embodiments, the route destination location may correspond to the observed location (i.e. any one of the destination locations). Accordingly, the parking data associated with the observed location may be used to generate a last mile model for the route destination location. In some embodiments, the route destination location may correspond to the unobserved location. In such cases, the observed locations near the unobserved location may be sufficiently sampled to generate its corresponding last mile model. The generated last mile model may be used to generate a parking map comprising a centroid location for the parked locations and an average walkable distance from the centroid location to the parked locations.

Various embodiments are provided to provide a parking recommendation based on the generated last mile model. For instance, the parking recommendation may be provided to the user of the vehicle, when the vehicle is located at the average walkable distance away from the route destination location. In this way, the parking recommendation may be provided prior to reaching the destination to reduce the unwanted situations. In various embodiments, the unwanted situations may include prolonged vehicle driving time, wastage of vehicle miles, pollutions and the like. Further, the disclosed method and system generate the last mile model dynamically based on a time of the day and the route destination location. Furthermore, the disclosed method and system provides the parking recommendation for the observed locations and/or locations around the observed locations (for instance, the unobserved locations) in the geographical map. These and other technical improvements of the invention will become evident from the description provided herein.

FIG. 1 illustrates block diagram 100 showing example architecture of one or more example embodiments. As shown in FIG. 1, the block diagram 100 may include a system 101, a navigation client 103, a user equipment or a user device 105, a mapping platform 107, and a network 109. The mapping platform 107 may further comprise a database 107*a* and a server 107*b*. In various embodiments, the system 101 may be a server (for instance, a backend server, a remotely located server, or the like), group of servers, distributed computing system, and/or other computing system. In some embodiment, the system 101 may be the server 107*b* of the mapping platform 107 and therefore may be co-located with or within the mapping platform 107. In an embodiment, the system may be co-located with or within an Original Equipment Manufacturer (OEM) cloud. In various embodiments, the system 101 may be in communication with the user equipment 105 for sourcing destination locations and parked locations associated with the destination locations.

In various embodiments, the user equipment 105 may include a mobile computing device such as a mobile phone, smart phone, laptop computer, tablet computer, navigation unit, personal data assistant, watch, or the like. The user equipment 105 may comprise processing means such as a central processing unit (CPU), storage means such as onboard read only memory (ROM) and random access memory (RAM), acoustic sensors such as a microphone array, position sensors such as a Global Positioning System (GPS) sensor, orientation sensors such as gyroscope, motion sensors such as accelerometer, a display enabled user interface such as a touch screen display, and other components as may be required for specific functionalities of the user equipment 105. Additional, different, or fewer components may be provided. For example, the user equipment 105 may be configured to execute and run mobile applications such as a messaging application, a browser application, a navigation application, and the like. According to some embodiments, the system 101 may be in communication with the navigation client 103 for sourcing the parking data and providing the parking recommendation.

In various embodiments, the navigation client 103 may be onboard a vehicle. In various embodiments, the vehicle may be an autonomous vehicle, a semi-autonomous vehicle, or a manual vehicle. In various embodiments, the navigation client 103 may be a vehicle navigation system, vehicle control system, a mobile computing device, a mobile data gathering platform and/or the like. For example, the navigation client 103 may be an in vehicle navigation system mounted within and/or be onboard the vehicle such as a motor vehicle, non-motor vehicle, automobile, car, scooter, truck, van, bus, motorcycle, bicycle, Segway, golf cart, and/or the like. In an example embodiment, the navigation client 103 may be a vehicle control system configured to autonomously drive the vehicle, assist in control of the vehicle, monitor various aspects of the vehicle (e.g., fault conditions, motor oil status, battery charge level, fuel tank fill level, and/or the like) and/or the like. In some embodiments, the navigation client 103 may be onboard a personal vehicle, commercial vehicle, public transportation vehicle, fleet vehicle, and/or other vehicle. The navigation client 103 may be any user accessible device such as a mobile phone, a smartphone, a portable computer, and the like that is portable in itself or as a part of another portable/mobile object such as a vehicle. In some example embodiments, the navigation client 103 may be associated, coupled, or otherwise integrated with a vehicle of the user, such as an advanced driver assistance system (ADAS), a personal navigation device (PND), a portable navigation device, an infotainment system and/or other device that may be configured to provide route guidance, parking functionalities and navigation related functions to the user. In this context, the user may be an autonomous or semi-autonomous vehicle. The navigation client 103 may comprise processing means such as a central processing unit (CPU), storage means such as onboard read only memory (ROM) and random access memory (RAM), acoustic sensors such as a microphone array, position sensors such as a GPS sensor, orientation sensors such as gyroscope, motion sensors such as accelerometer, a display enabled user interface such as a touch screen display, and other components as may be required for specific functionalities of the navigation client 103. Additional, different, or fewer components may be provided. For example, the navigation client 103 may be configured to execute and run mobile applications such as a messaging application, a browser application, a navigation application, and the like. In various embodiments, the navigation client 103 may be in communication with the mapping platform 107 for specific functionalities of the navigation client 103, via the network 109.

The mapping platform 107 may comprise a database 107*a* for storing map data and a server 107*b*. The database 107*a* may store node data, road segment data, link data, link identification information, heading value records, point of interest (POI) data, or the like. The database 107*a* may also store cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the database 107*a* may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 107*a* may also store data about the POIs and their respective locations in the POI records. The database 107*a* may further store parking data associated with the POI location in the POI records. The database 107*a* may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the database 107*a* can include event data (e.g., traffic incidents, construction activities, scheduled events, unscheduled events, accidents, diversions etc.) associated with the POI data records or other records of the database 107*a*. Optionally or additionally, the database 107*a* may store 3D building maps data (3D map model of objects) of structures surrounding roads and streets. The database 107*a* may store historic parking data which may comprise data about parking spots, parking destinations, walking distance and the like collected previously with respect to a time of day. In some example embodiments, this historic parking data may be collected for a predetermined time period, such as for days, weeks or months, and such collected data may be stored in the database 107a.

The database 107a may be maintained by a content provider e.g., a map developer. By way of example, the map developer may collect geographic data to generate and enhance the database 107a. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used to generate map geometries directly or through machine learning as described herein.

The database 107a may be a master database stored in a format that facilitates updating, maintenance, and development. For example, the master database or data in the master database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, parking guidance, speed calculation, distance and travel time functions, and other functions, by a navigation device, such as by client such as the navigation client 103, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received database in a delivery format to produce one or more compiled navigation databases.

As mentioned above, the database 107a may be a master geographic database, but in alternate embodiments, the database 107a may be embodied as a client-side database and may represent a compiled navigation database that may be used in or with end user devices (e.g., the navigation client 103) to provide navigation and/or map-related functions. For example, the database 107a may be used with the navigation client 103 to provide an end user with navigation and parking features. In such a case, the database 107a may be downloaded or stored on the navigation client 103.

The server 107b may comprise processing means and communication means. For example, the processing means may comprise one or more processors configured to process requests received from the navigation client 103. The processing means may fetch map data from the database 107a and transmit the same to the navigation client 103 in a format suitable for use by the navigation client 103. In one or more example embodiments, the mapping platform 107 may periodically communicate with the navigation client 103 via the processing means to update a local cache of the map data stored on the navigation client 103. Accordingly, in some example embodiments, the map data may also be stored on the navigation client 103 and may be updated based on periodic communication with the mapping platform 107. In some embodiments, the mapping platform 107 may be configured to communicate with the navigation client 103 and the user equipment 105 over the network 109.

The network 109 may be wired, wireless, or any combination of wired and wireless communication networks, such as cellular, Wi-Fi, internet, local area networks, or the like. In one embodiment, the network 109 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In some example embodiments, the navigation client 103 may be configured for communicating with the system 101 over the network 109 to provide parking related services, such as parking recommendations.

FIG. 2 illustrates a block diagram of the system 101 for providing a parking recommendation, in accordance with one or more example embodiments of the present invention. The system 101 may include a processing means such as at least one processor 201, storage means such as a memory 203, and a communication means such as at least one communication interface 205. Further, the system 101 may include a data sourcing module 201a and a data aggregation module 201b. The data sourcing module 201a may be configured to source parking data from various navigation clients 103 and/or user devices, such as the user equipment 105. The data aggregation module 201b may be configured to aggregate all the sourced data, and use it to generate a last mile model for at least one destination of the sourced parking data to provide the parking recommendation. In various embodiments, the data sourcing module 201a and the data aggregation module 201b may be embodied in the processor 201. The processor 201 may retrieve computer program code instructions that may be stored in the memory 203 for execution of computer program code instructions by the modules 201a and 201b, which may be configured for providing a parking recommendation.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally or alternatively, the processor 201 may include one or more processors configured in tandem via the bus to enable independent execution of instructions, pipelining and/or multithreading.

Additionally or alternatively, the processor 201 may include one or more processors capable of processing large volumes of workloads and operations to provide support for big data analysis. In an example embodiment, the processor 201 may be in communication with a memory 203 via a bus for passing information among components of structure 100. The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

In some embodiments, the processor 201 may be configured to provide Internet-of-Things (IoT) related capabilities to users of the system 101, where the users may be a traveler, a rider, a pedestrian, a driver of the vehicle and the like. In some embodiments, the users may be or correspond to an autonomous or semi-autonomous vehicle. The IoT related capabilities may in turn be used to provide smart parking solutions and navigation solutions by providing real time updates to the users. The system 101 may be accessed using the communication interface 205. The communication interface 205 may provide an interface for accessing various features and data stored in the system 101. For example, the communication interface may comprise I/O interface which may be in the form of a GUI, a touch interface, a voice enabled interface, a keypad and the like. For example, the communication interface may be a touch enabled interface of a navigation device installed in a vehicle, which may display various navigation related data to the user of the vehicle. Such navigation related data may include information about upcoming conditions on a route, route display, alerts about vehicle speed, user assistance while driving, user assistance while finding parking spaces, display of parking recommendations and the like.

FIG. 3 illustrates a flowchart depicting a method 300 for providing the parking recommendation, in accordance with one or more example embodiments. Starting at step 301, the method 300 may include obtaining a route destination location. The route destination location may be obtained from the navigation client 103 and/or from the user equipment 105. In various embodiments, the route destination location may be an address in the geographical map that includes observed locations (for instance, a plurality of destination locations) and unobserved locations. The observed locations may be the locations on the geographical map that comprise a threshold number of samples for parking data, for instance, the parked locations associated with the observed locations. The unobserved locations are the locations on the geographical map that may comprise less number of samples for the parking data (for instance, the parked locations). The route destination location may be an address to which the user may want to navigate to. In some example embodiments, the route destination location may be a POI, when the route destination location corresponds to the observed location. In some example embodiments, when the route destination location corresponds to the unobserved location, the route destination location may be adjusted to at least one of the nearby POI associated with the unobserved locations, the cluster of POIs associated with or near the unobserved locations, the building front or near the unobserved locations, the city block or near the unobserved locations, or the cluster of city blocks or near the unobserved locations. Accordingly, the route destination location may be an address, a point of interest (POI), a nearby POI, a cluster of POIs, a building footprint, a city block, or a cluster of city blocks.

At step 303, the method 300 may include obtaining parking data for a pre-determined time period. The parking data may comprises a plurality of destination locations and parked locations associated with each of the plurality of destination locations. In some embodiments, the parking data may comprise data related to a walking distance and/or a walking time from the parked location to the destination location. The destination location may be the observed location such as the POI. In various embodiments, the parking data associated with the destination location may dynamically vary with respect to time. Accordingly, the parking data may be obtained for the pre-determined time period, which may be previous to the time of day. The time period may be a period of day, a week, a month, or a year. In various embodiments, the time period may be based on holidays, working days, event schedules, weather conditions of the day, seasons such as winter, summer and the like. The parking data may be obtained from various navigation clients 103 and user devices such as user equipment 105. In various embodiments, the navigation client 103 may be onboard a vehicle to report a destination location and its corresponding parked location. For instance, the navigation client 103 (comprising the GPS sensors) may report the user entered destination, as the route destination location and a last location of the vehicle before the navigation client 103 was turned-off, as the parked location or the parking spot for the destination location. In some embodiments, the navigation client 103 may determine a walking route between the parked location and the destination location. The navigation client 103 may report, using the walking route, the walking distance between the parked location and the destination location and/or the walking time to reach the destination location from the parked location. According to some example embodiments, the user equipment 105 may be associated with a user of the vehicle to report a destination location and its corresponding parked location. The user equipment 105 (comprising the onboard sensors) may detect current transport mode of the user. For instance, the user equipment 105 may determine whether the user is traveling in the vehicle or the user is walking. Further, the user equipment 105 may determine a location where the transition occurred from driving mode (i.e. the user is traveling through the vehicle) to the walking mode. The user equipment 105 may report the transition occurred location, as the parked location and the POI location reached, as the destination location. In some embodiments, the user equipment 105 may determine the walking route between the parked location and the destination location. The user equipment 105 may report, using the walking route, the walking distance between the parked location and the destination location and/or the walking time to reach the destination location from the parked location. In various embodiments, the navigation client 103 and the user equipment 105 may report the destination location and its corresponding parked location with a time stamp attached. The time stamp may comprise a time of the day (for instance, a time of the day at which the last location of the vehicle was determined or a time of the day at which the transition occurred location was determined), a day of the week and the like.

At step 305, the method 300 may include providing the parking recommendation to a user, who may be using the navigation client and who may want to reach the route destination location. In various embodiments, the parking recommendation may be provided to the navigation client 103 and/or the user equipment 105. In various embodiments, the parking recommendation may comprise a notification to start a parking search. In some embodiments, the parking search may also comprise generating a parking search cruising route based on per-link parking availability estimates. A link may be a segment of a road, a street, a lane of travel and the like.

In some embodiments, the parking search cruise path may start when the time-dependant distance threshold is reached. A parking search cruise is a type of route which ends with the vehicle parking. It may not have a set destination, but it creates a path through road links that have an estimated likelihood of having free parking—that availability information may be queried from third party services. In some embodiments, the parking recommendation may comprise a notification for indicating a potential parking space for the vehicle. For instance, a notification may be provided to indicate that a next parking space on a route to the route destination location is the potential parking space. At step 305, the method 300 may further include generating a last mile model for the route destination to provide the parking recommendation. Further, the generation of the last mile model is explained in detail with reference to FIG. 4.

FIG. 4 illustrates a flowchart depicting a method 400 for generating a last mile model for the route destination location, in accordance with one or more example embodiments.

Starting at step 401, the method 400 may include determining a plurality of equal-sized time epochs corresponding to the pre-determined time period. In various embodiments, a threshold time interval (i.e. a size of the time epoch) may be provided by the user or may be pre-defined. The threshold time interval may be used to divide the pre-determined time period into a plurality of time epochs of size equal to the size of the threshold time interval. For instance, the time period of a week may be divided into five hundred and four time (504) equal-sized time epochs, if the threshold time interval is twenty minutes.

At step 403, the method 400 may include grouping the obtained parking data, based on the determined plurality of equal-sized time epochs and the time stamp corresponding to each of the plurality of parked locations. According to some embodiments, the parking data corresponding to the route destination location may be determined from the obtained parking data. In various embodiments, the route destination location may be the observed location, for instance, the destination location. The parked locations corresponding to the destination location may be grouped using the time stamp attached to the parked locations and the determined plurality of equal-sized time epochs. In various embodiments, the grouped parked locations corresponding to the destination location may represent a historic parking pattern for the route destination location.

In some embodiments, the route destination location may be the unobserved location. When the route destination location is the unobserved location, the nearby destination location (i.e. POI) associated with the route destination location or the cluster of destination locations associated with the route destination location may be determined. For instance, a threshold number of samples may be extracted around the route destination location to determine the nearby destination location or the cluster of destination locations. The threshold number of samples may be the threshold number of parked locations required for generating the historic parking model. The parked locations corresponding to the cluster of destination locations or the nearby destination location may be grouped using the destination location, time stamp attached to the parked locations, and the determined plurality of equal-sized time epochs.

At step 405, the method 400 may include selecting at least one equal-sized time epoch of the plurality of equal-sized time epochs. In various embodiments, the at least one time epoch of the equal-sized time epochs may be selected based on a time of the day. In various embodiments, the time of the day may be a current time of the day, a vehicle arrival time to the route destination location or the like.

At step 407, the method 400 may include computing a centroid location for the parking data corresponding to the selected equal-sized time epoch. In various embodiments, the parking data of the selected time epoch may comprise the parked locations that correspond to the route destination. The centroid location may be computed using the parked locations that correspond to the route destination. The centroid location may be a center location for the parked locations. In various embodiments, the centroid location may be the POI, an address, coordinate pair and the like. The centroid location may be the POI, when the route destination location corresponds to the observed location. In some embodiments, the centroid location may be associated with at least one of a nearby POI, a cluster of POIs, a building footprint, a city block, or a cluster of city blocks.

At step 409, the method 400 may include determining a time-dependent distance threshold associated with the route destination location, based on the computed centroid location and the parking data corresponding to the selected equal-sized time epoch. In various embodiments, an average distance between the centroid location and the parked locations (i.e. the parked locations that correspond to the route destination location) is computed to determine the time-dependent distance threshold. In some embodiments, an average time to walk from the parked locations (i.e. the parked locations that correspond to the route destination) to the centroid location is computed and the average time to walk may be converted to the time-dependent distance threshold using suitable calibration. For instance, the average walking speed (i.e. four to five kilometers per hour) may be used to convert the average time to time-dependent distance threshold. In various embodiments, the time-dependent distance threshold may be the average walking distance from the parked locations to the centroid location.

At step 411, the method 400 may include determining a standard deviation distance associated with the route destination location, based on the time-dependent distance threshold and the parking data corresponding to the selected equal-sized time epoch. For instance, the standard deviation distance for the distances from the parked locations (i.e. the parked locations that correspond to the route destination location) to the centroid location is determined. The standard deviation distance may be included in the last mile model to account for marginal variations in the time-dependent distance threshold, such as based on various samples of obtained parking data. For example, is a parking data sample comprises a time-dependent distance threshold that may be one standard deviation unit of distance away from the computed time-dependent distance threshold, such time-dependent distance threshold may also be included to be a part of the last mile model based on the obtained parking data samples.

At step 413, the method 400 may include generating the last mile model comprising the time-dependent distance threshold and the standard deviation distance associated with the route destination location. The last mile model may further comprise the centroid location. In various embodiments, the last mile-model may be used to generate a parking map to be displayed on the user interface of the navigation system 103 and/or the user equipment 105. In various embodiments, the parking map may comprise the centroid location which may be encircled by two concentric circles. In various embodiments, a circle with a center closer to the centroid location may have a radius as the time-dependent distance threshold. In various embodiments, a circle with a center away from the centroid location may have a radius as sum of the time-dependent distance threshold and the standard deviation distance. In various embodiments, the circle with the radius as the time-dependent distance threshold may have least probability (e.g. 0.682) for searching the parking space (for instance, the circle may be one sigma distance boundary). In various embodiments, the circle with the radius as the sum of the time-dependent distance threshold and the standard deviation distance may have higher probability than the circle with the radius as the time-dependent distance threshold.

As should be understood, the generated last mile model may be used to provide the parking recommendation for the route destination location. According to some embodiments, the method 400 may include determining a location of the vehicle to determine whether the vehicle is time-dependent distance threshold away from the centroid location for providing the parking recommendation. When a distance between the vehicle location and the centroid location is less than the time-dependent distance threshold, the parking recommendation for the route destination may be provided via the navigation client 103 and/or the user equipment 105. In various embodiments, the parking recommendation may include providing a prompt on the user interface to select an alternate destination area, based on the centroid location of the last mile model and providing route navigation information for the alternate destination area on selecting the prompt. The prompt may be provided on the navigation client 103 and/or the user equipment 105. In various embodiments, the alternate destination area may be the adjusted route destination location, for instance, the centroid location.

It will be understood that each step of the flowcharts of the method 300 and 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 203 of the system 101, employing an embodiment of the present invention and executed by the processor 201. As will be appreciated, any such computer program instructions may be loaded onto a computer or other programmable apparatus (for example, hardware) to produce a machine, such that the resulting computer or other programmable apparatus implements the functions specified in the flowchart steps. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart steps. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart steps.

Accordingly, steps of the flowcharts support combinations of means for performing the specified functions and combinations of operations for performing the specified functions for performing the specified functions. It will also be understood that one or more steps of the flowcharts, and combinations of steps in the flowcharts, may be implemented by special purpose hardware-based computer systems which perform the specified functions, or combinations of special purpose hardware and computer instructions.

In an example embodiment, a system for performing the methods of FIG. 3 and FIG. 4 above may comprise a processor (e.g. the processor 201) configured to perform some or each of the operations (301-303 and 401-413) described above. The processor may, for example, be configured to perform the operations (301-303 and 401-413) by performing hardware implemented logical functions, executing stored instructions, or executing algorithms for performing each of the operations. Alternatively, the system may comprise means for performing each of the operations described above. In this regard, according to an example embodiment, examples of means for performing operations (301-303 and 401-413) may comprise, for example, the processor 201 and/or a device or circuit for executing instructions or executing an algorithm for processing information as described above. Further, the methods 300 and 400 implementations on the system 101 may be evident with reference to FIG. 5-FIG. 8.

FIG. 5 illustrates an exemplary scenario 500 for providing the parking recommendation, in accordance with one or more example embodiments. As illustrated in FIG. 5, the scenario 500 may comprise the system 101, the mapping platform 107, the network 109, a vehicle 501, a route destination location 503, and a travel route 505. A user of the vehicle 501 based on his/her requirements moves from one location (for instance, a user's current location) to another location (for instance, the destination location) through the vehicle 501. The vehicle 501 may be an autonomous vehicle, a semi-autonomous vehicle, or a manual vehicle. To move from one location to another location the user may enter the route destination location 503 (for instance, an address) on the navigation client 103 and/or the user equipment 105 associated with the vehicle 501. The route destination location 503 may be the observed location or the unobserved location. When the route destination location 503 corresponds to the observed location, the route destination location 503 may be a POI. When the route destination location 503 corresponds to the unobserved location, the route destination location 503 may be adjusted to at least one of the nearby POI associated with the unobserved locations, the cluster of POIs associated with the unobserved locations, the building front associated with the unobserved locations, the city block associated with the unobserved locations, or the cluster of city blocks (e.g. neighborhood) associated with the unobserved locations.

The navigation client 103 may generate the travel route 505, such as the last mile route, between the current location (for instance, the user's current location) and the route destination location 503. The travel route 505 may be an optimum route to reach the route destination location 503. Further, the navigation client 103 and/or the user equipment 105 may generate a request, to the system 101, for parking recommendation to the route destination location 503. The request may comprise the route destination location 503 and a time of the day. In various embodiments, the time of the day may be a current time of the day, a vehicle arrival time to the route destination location 503, or the like.

The system 101 in response to the request, the system 101 may obtain the parking data for the pre-determined time period, which was previously collected and thus may be the historic parking data. The time period may be a period of day, a week, a month, or a year. In various embodiments, the time period may be based on holidays, working days, event schedules, weather conditions of the day, seasons such as winter, summer and the like. In various embodiments, the system 101 may obtain the parking data from the memory 203 or the mapping platform 107. In various embodiments, the stored parking data may be received from various navigation clients 103 and user devices such as user equipment 105 via the data sourcing module 201a. The parking data may comprise the plurality of destination locations and the parked locations or parking spots associated with each of the destination locations. According to some example embodiments, the parking data may further comprise the time stamp corresponding to each of the parked locations. The time stamp may comprise a time of the day (for instance, a time of the day at which the last location of the vehicle was determined or a time of the day at which the transition occurred location was determined), a day of the week and the like.

The system 101 may determine a plurality of time epochs corresponding to the pre-determined time period. In various embodiments, the system 101 may select a window indicative of the pre-determined time period. The system 101 may further divide the selected window into the plurality of equal-sized time epochs using the threshold time interval. For instance, the time period of a week may be divided into five hundred and four time (504) equal-sized time epochs, if the threshold time interval is twenty minutes. In various embodiments, the threshold time interval (i.e. a size of the time epoch) may be provided by the user or may be pre-defined.

The system 101 may group the obtained parking data, based on the determined plurality of equal-sized time epochs and the time stamp corresponding to each of the plurality of parked locations. In various embodiments, the system 101 may determine the parking data corresponding to the route destination location 503 from the obtained parking data. In various embodiments, the route destination location 503 may be the observed location, for instance the destination location. The parked locations corresponding to the destination location may be grouped using the time stamp attached to the parked locations and the determined plurality of equal-sized time epochs. In various embodiments, the grouped parked locations corresponding to the destination location may represent a historic parking pattern for the route destination location 503. According to some example embodiments, the system 101 may store the historic parking pattern for each of the destination locations. Accordingly, the historic parking pattern corresponding to the route destination location 503 may be obtained.

In some embodiments, the route destination location 503 may be the unobserved location. When the route destination location 503 corresponds to the unobserved location, the nearby destination location (i.e. POI) associated with the route destination location 503 or the cluster of destination locations associated with the route destination location 503 may be determined. For instance, a threshold number of samples may be extracted around the route destination location 503 to determine the nearby destination location or the cluster of destination locations. The threshold number of samples may be the threshold number of parked locations required for generating the last mile model. The parked locations corresponding to the cluster of destination locations or the nearby destination location may be grouped using the destination location, time stamp attached to the parked locations, and the determined plurality of equal-sized time epochs.

The system 101 may select the at least one equal-sized time epoch of the plurality of equal-sized time epochs. For instance, the system 101 may select a portion of at least one historic parking pattern that corresponds to the route destination location 503. In various embodiments, the at least one time epoch of the equal-sized time epochs may be selected based on the time of the day. In various embodiments, the time of the day may be the part of the received request.

According to some embodiments, the system 101 may generate the walking distance distribution map using the selected equal-sized time epoch. Further, the generation of the walking distance distribution map is explained in detail with reference to FIG. 6.

FIG. 6 illustrates an exemplary walking distance distribution map 600, in accordance with one or more example embodiments. As illustrated in FIG. 6, the walking distance distribution map 600 may include the route destination location 503 and parked locations 601, 603, 605, 607, and 609. In various embodiments, the parked locations 601, 603, 605, 607, and 609 may be the parked locations in the selected equal-sized time epoch of at least one historic parking pattern that corresponds to the route destination locations 503. According to some example embodiments, the system 101 may perform the following steps to generate the walking distance distribution map 600: locate each of parked locations 601, 603, 605, 607, and 609 in the geographical map; determine a last mile walking trajectory from each of the parked locations 601, 603, 605, 607, and 609 to the route destination location 503. According to some embodiments, the system 101 may generate the last mile model using the generated walking distance distribution map 600. Further, the determination of the last mile model is explained in detail, referring to FIG. 7.

FIG. 7 illustrates an exemplary last mile model 700 for the destination location 503, in accordance with one or more example embodiments. As illustrated in FIG. 7, the last mile model 700 may comprise the route destination location 503, a first time-dependent perimeter 701 for the route destination location 503, and a second time-dependent perimeter 703 for the route destination location 503. The time-dependent perimeter may be based on an average walking time from a parked location to the destination location, 503. That is to say. The time taken to cover the last mile route, from the parked location to the destination location may be used to build the last mile model 700. In various embodiments, the system 101 may compute a centroid location for the obtained parking data (such as the previously collected historic parking data) corresponding to the selected equal-sized time epoch. For instance, the system 101 may compute the centroid location for the parked locations 601, 603, 605, 607, and 609. The centroid location may be a center point of the parked locations 601, 603, 605, 607, and 609. In various embodiments, the centroid location may be the route destination location 503.

In various embodiments, the system 101 may determine a time-dependent distance threshold associated with the route destination location 503, based on the computed centroid location and the parking data corresponding to the selected equal-sized time epoch (i.e. the parked locations 601, 603, 605, 607, and 609). In various embodiments, the system 101 may compute the average walking distance from the parked locations 601, 603, 605, 607, and 609 to the centroid location to determine the time-dependent distance threshold. In some embodiments, the system 101 may compute the average time to walk from the parked locations (i.e. the parked locations 601, 603, 605, 607, and 609) to the centroid location and convert the average time to walk to the time-dependent distance threshold using suitable calibration. For instance, the average walking speed (i.e. four to five kilometers per hour) may be used to convert the average time to time-dependent distance threshold. In some embodiments, the average walking speed may be calibrated to the user's walking speed. In various embodiments, the time-dependent distance threshold may be the average walking distance from the parked locations 601, 603, 605, 607, and 609 to the centroid location for a selected time epoch.

In various embodiments, the system 101 may determine the standard deviation distance associated with the route destination location 503, based on the time-dependent distance threshold and the parking data corresponding to the selected equal-sized time epoch. For instance, the standard deviation distance for the distances from the parked locations (i.e. the parked locations 601, 603, 605, 607, and 609) to the centroid location is determined.

In various embodiments, the system 101 may generate the last mile model 700 using the time-dependent distance threshold and the standard deviation distance associated with the route destination location. In various embodiments, the system may generate the first time-dependent perimeter 701 for the centroid location. In various embodiments, the first time-dependent perimeter 701 may be perimeter of a circle or a sphere that encloses the route destination location 503. In various embodiments, the first time-dependent perimeter 701 may have its radius as the time-dependent distance threshold. In some embodiments, the first time-dependent perimeter 701 may correspond to a boundary with a probability of finding at least one parking space for the vehicle 501. For instance, the minimum probability for finding the parking space may be 0.682 (also referred to as one sigma distance boundary). In various embodiments, the system 101 may generate the second time-dependent perimeter 703 for the centroid location. In various embodiments, the second time-dependent perimeter 703 may be perimeter of another circle or another sphere that encloses the route destination location 503. In various embodiments, the second time-dependent perimeter 703 may have its radius as the sum of the time-dependent distance threshold and the standard deviation distance. In various embodiments, the second time-dependent perimeter 703 may correspond to a boundary with greater probability then the first time-dependent perimeter 701 for finding the at least one parking space. In some embodiments, the first time-dependent perimeter 701 and the second time-dependent perimeter 703 may be concentric with the center to be the centroid location.

In various embodiments, the last mile model 700 may be used to generate the parking map comprising the route destination location 503, the first time-dependent perimeter 701, and the second time-dependent perimeter 703. According to some embodiments, the parking map may be a map to be displayed on the user interface of the navigation system 103 and/or the user equipment 105. In some embodiments, the first time-dependent perimeter 701 and the second time-dependent perimeter 703 may be highlighted with different intensities of a color to indicate their corresponding probabilities for finding the parking space. According to some embodiments, the system 101 may provide the parking recommendation based on the generated last mile model 700. Further, the system 101 for providing the parking recommendation to the vehicle 301 is explained in detail with reference to FIG. 8.

FIG. 8 illustrates an exemplary scenario 800 for providing the parking recommendation based on the last mile model 700, in accordance with one or more example embodiments. As illustrated in FIG. 8, the scenario 800 may include the vehicle 501, the destination location 503, the travel route 505, the parking locations 601, 603, 605, 607, and 609, the first time-dependent perimeter 701, and the second time-dependent perimeter 703. In various embodiments, the system 101 may continuously monitor the location of vehicle 501 to determine whether vehicle 501 has entered the first time-dependent perimeter 701. For instance, the system 101 may determine whether the vehicle 501 is time-dependent distance threshold away from the centroid location. In various embodiments, the first time-dependent perimeter 701 may act as geo-fencing for the providing the parking recommendation. When the vehicle 501 enters the first time-dependent perimeter 701, the system 101 may provide the parking recommendation to the navigation client 103 and/or the user equipment 105. In various embodiments, the parking recommendation may comprise a notification to start a parking search. In some embodiments, the parking recommendation may comprise a notification for indicating a potential parking space for the vehicle 501. For instance, a notification may be provided to indicate that a next parking space on a route to the route destination location is the potential parking space. According to some example embodiments, the parking recommendation may include providing a prompt on the user interface to select an alternate destination area, based on the centroid location of the last mile model 700 and providing route navigation information for the alternate destination area on selecting the prompt. The prompt may be provided on the navigation client 103 and/or the user equipment 105. In various embodiments, the alternate destination area may be the adjusted route destination location, for instance the centroid location.

In some example embodiments, instead of the time-dependent distance threshold 701, a distance which is one standard deviation away as compared to the radius of circle 701, that is the time-dependent distance threshold with standard deviation 703, may be used for providing the parking recommendation.

In this way, the parking recommendation may be provided prior reaching the route destination location 503 to avoid the unwanted situations such as the wastage of vehicle miles, pollutions, increased vehicle driving time, and the like. Further, the system 101 may generate the last mile model 700 dynamically based on the time of the day and the route destination location 503. Furthermore, the system 101 may provide the parking recommendation for the observed locations and/or the locations around the observed locations (for instance, the unobserved locations) in the geographical map. The last mile model 700 may be generated based on data of last leg of travel journey of a user, which is generally the walking leg of the travel journey, such as from a spot where the user parks their vehicle 501 (for example any of the parked locations 601-609), to their destination location (such as location 503). The methods and systems disclosed herein provide for sourcing data for this last walking leg of the journey and use it to provide accurate data for searching for available parking spaces (such as on-street parking spaces) well in time. The sourcing this data for the last walking leg provides greater accuracy as compared to available solutions in the art.

FIG. 9 illustrates an exemplary scenario 900 for sourcing the parking data, in accordance with one or more example embodiments. As illustrated in FIG. 9, the scenario 900 may comprise the system 101, the mapping platform 107, the network 109, a vehicle 901, a user equipment 903, a destination location 905, a walking trajectory 907, and a location 909. In various embodiments, the user equipment 903 may be associated with a user of the vehicle 901. The user equipment 903 may be the user equipment 105 as detailed described in FIG. 1. In some example embodiments, vehicle 901 may be equipped with a navigation client, such as the navigation client 103 depicted in FIG. 1. However, in some embodiments, the user equipment 903 may itself be configured to provide navigation assistance functions. Further, in some embodiments the user equipment 903 may receive, from the user, the destination location 905 to navigate the user to the destination location 905. In some example embodiments, the user equipment 903 may continuously monitor the transport mode of the user. For instance, the user equipment 903 may continuously determine whether the user is traveling in the vehicle 901 or the user is walking. In various embodiments, the user equipment 903 may determine, using the monitored transport mode of the user, the location 909 where the transition occurred from the driving mode (i.e. the user traveling in the vehicle 901) to walking mode. This transition information may be useful in determining when a parking event occurred. For example, when the user equipment 903 determines that in the associated vehicle 901 has parked and the use is now moving towards destination 905 by walking, this may be reported as the parking event, and the location 909 as the parked location. Further, the rest of route from location 909 to destination 905 may be reported as the last mile route, which is the last walking leg 907. The distance travelled on this last walking leg, 907 may be reported to the system 101 in some embodiments as the walking distance. Further, multiple reports of such walking distance events may be used to determine an average walking distance, which may further be used to compute a time-dependent distance threshold, as discussed previously in various embodiments. Further, the user equipment 903 may transmit the location 909 (for instance, the parked location) and the destination location 905 as the parking data to the system 101. The system 101 may receive the parking data, via the data sourcing module 201a. In some embodiments, the user equipment 903 may determine the walking trajectory 907 (i.e. the walking route) from the location 909 to the destination location 905. The user equipment 903 may further determine, using the walking trajectory 907, a walking distance between the location 909 and the destination location 905 and/or a walking time to reach the destination location 905 from the location 909. According to some example embodiments, the user equipment 903 may transmit the determined walking distance and/or the determined walking time as a part of the parking data. In some embodiments, the vehicle 901 may be equipped with the navigation client 103. The navigation client 103 may determine the last location of the vehicle 901, for instance, the location 909. In some embodiments, the last location may be the location where the vehicle 901 was parked and/or turned off. The navigation client 103 may transmit the location 909 (for instance, the parked location) and the destination location 905 as the parking data to the system 101. According to some embodiments, the navigation client 103 may also determine the walking distance from the location 909 to the destination location 905 and/or the walking time to reach the destination location 905 from the location 909. The navigation client 103 may transmit the determined walking distance and/or the determined walking time as a part of the parking data.

In this way, the system 101 may source the parking data from a plurality of vehicles, such as the vehicle 901. The sourced parking data may be stored as the historic parking data. The system 101 may generate, using the sourced parking, the last mile model based on the time of the day and the route destination location, as detailed above. The system 101 may provide the parking recommendation for the route destination location in accordance to the generated last mile model. Further, using this type of data sourcing, accurate data for providing recommendation for on-street parking may also be provided, without the need of any dedicated sensors or data exchange of data between competing parking service providers.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for providing a parking recommendation, the method comprising:
   obtaining a route destination location from a user equipment;
   obtaining parking data for a pre-determined time period, wherein the parking data comprises a plurality of parked locations and a plurality of destination locations; and
   providing the parking recommendation based on a last mile model, wherein the last mile model is based on the route destination location and the obtained parking data, wherein the last mile model comprises a time-dependent distance threshold and a centroid location based on the obtained parking data, wherein the time-dependent distance threshold is based on an average travel time from the plurality of parked locations to the route destination location, and wherein the centroid location is a center point of the plurality of parked locations associated with the obtained parking data for the pre-determined time period.

2. The method of claim 1, wherein providing the parking recommendation further comprises providing a notification on the user equipment to start a parking search, based on a comparison of a distance between the centroid location and a location of the user equipment, with the time-dependent distance threshold.

3. The method of claim 2, wherein providing the parking recommendation further comprises generating a parking search cruising route based on per-link parking availability estimates.

4. The method of claim 1, wherein the obtained parking data further comprises a time stamp corresponding to each of the plurality of parked locations.

5. The method of claim 4, wherein providing the parking recommendation based on the last mile model further comprises:
   determining a plurality of equal-sized time epochs corresponding to the pre-determined time period; and
   grouping the obtained parking data, based on the determined plurality of equal-sized time epochs and the time stamp corresponding to each of the plurality of parked locations.

6. The method of claim 5, wherein providing the parking recommendation based on the last mile model further comprises:
   selecting at least one equal-sized time epoch of the plurality of equal-sized time epochs;
   computing the centroid location for the obtained parking data corresponding to the selected equal-sized time epoch; and
   determining the time-dependent distance threshold associated with the route destination location based on the computed centroid location.

7. The method of claim 6, wherein providing the parking recommendation based on the last mile model further comprises:
   determining a standard deviation distance associated with the route destination location, based on the time-dependent distance threshold and the obtained parking data corresponding to the selected equal-sized time epoch; and
   generating the last mile model comprising the time-dependent distance threshold and the standard deviation distance associated with the route destination location.

8. The method of claim 1, wherein the time-dependent distance threshold is based on an average walking distance associated with the centroid location and the plurality of parked locations associated with the obtained parking data for the pre-determined time period.

9. The method of claim 8, wherein the average walking distance is further based on a transition between driving and walking modes of transport.

10. The method of claim 1, wherein the centroid location is associated with at least one of an address, a point of interest (POI), a cluster of POIs, a building footprint, a city block or a cluster of city blocks.

11. The method of claim 1, wherein providing the parking recommendation further comprises:
    providing the notification on the user equipment to start a parking search when a distance between the centroid location and a location of the user equipment is lesser than the time-dependent distance threshold.

12. The method of claim 1, wherein providing the parking recommendation further comprises:
    providing a prompt on a user interface of the user equipment to select an alternate destination area, based on the centroid location of the last mile model; and
    providing route navigation information for the alternate destination area on selecting the prompt.

13. A method for providing a parking recommendation, comprising:
    obtaining parking data for a pre-determined time period, wherein the parking data comprises a plurality of parked locations and a plurality of destination locations;
    determining a time-dependent distance threshold based on a last mile model associated with the parking data, wherein the time-dependent distance threshold is based on an average walking distance threshold associated with the plurality of parked locations and the plurality of destination locations, wherein the last mile model comprises the time-dependent distance threshold and a centroid location based on the obtained parking data, and wherein the centroid location is a center point of the plurality of parked locations associated with the obtained parking data for the pre-determined time period; and
    providing the parking recommendation based on the determined time-dependent distance threshold.

14. The method of claim 13, wherein the average walking distance is further based on a transition between driving and walking modes of transport.

15. A system for providing a parking recommendation, the system comprising:
    a memory configured to store computer-executable instructions; and
    one or more processors configured to execute the instructions to:
    obtain a route destination location from a user equipment;
    obtain parking data for a pre-determined time period, wherein the parking data comprises a plurality of parked locations and a plurality of destination locations; and provide the parking recommendation based on a last mile model, wherein the last mile model is based on the route destination location and the obtained parking data wherein the last mile model comprises a time-dependent distance threshold and a centroid location based on the obtained parking data, wherein the time-dependent distance threshold is based on an average travel time from the plurality of parked locations to the route destination location, and wherein the centroid location is a center point of the plurality of parked locations associated with the obtained parking data for the pre-determined time period.

16. The system of claim 15, wherein to provide the parking recommendation, the one or more processors are further configured for providing a notification on the user equipment to start a parking search, based on a comparison of a distance between the centroid location and a location of the user equipment with the time-dependent distance threshold.

17. The system of claim 15, wherein the obtained parking data further comprises a time stamp corresponding to each of the plurality of parked locations.

18. The system of claim 17, wherein to provide the parking recommendation, the one or more processors are further configured to:

determine a plurality of equal-sized time epochs corresponding to the pre-determined time period; and group the obtained parking data, based on the determined plurality of equal-sized time epochs and the time stamp corresponding to each of the plurality of parked locations.

19. The system of claim 15, wherein the time-dependent distance threshold is based on an average walking distance associated with the centroid location and the plurality of parked locations associated with the parking data for the pre-determined time period.

20. The system of claim 19, wherein the average walking distance is further based on a transition between driving and walking modes of transport.

* * * * *